(12) United States Patent
Hui et al.

(10) Patent No.: US 10,499,349 B2
(45) Date of Patent: Dec. 3, 2019

(54) USER EQUIPMENT AND METHOD FOR TRANSMITTING MESSAGE IN MULTI-BEAM SYSTEM

(71) Applicant: ELECTRONICS AND TELECOMMUNICATIONS RESEARCH INSTITUTE, Daejeon (KR)

(72) Inventors: Bing Hui, Daejeon (KR); Il Gyu Kim, Chungcheongbuk-do (KR); Junhyeong Kim, Daejeon (KR); Gosan Noh, Daejeon (KR); Hee Sang Chung, Daejeon (KR); Sung Woo Choi, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 16/005,920

(22) Filed: Jun. 12, 2018

(65) Prior Publication Data

US 2018/0359712 A1 Dec. 13, 2018

(30) Foreign Application Priority Data

Jun. 12, 2017 (KR) .................. 10-2017-0073363
Jun. 22, 2017 (KR) .................. 10-2017-0079082
Jun. 12, 2018 (KR) .................. 10-2018-0067479

(51) Int. Cl.
*H04W 52/36* (2009.01)
*H04W 52/48* (2009.01)
(Continued)

(52) U.S. Cl.
CPC ........ *H04W 52/362* (2013.01); *H04B 7/0404* (2013.01); *H04B 7/0408* (2013.01);
(Continued)

(58) Field of Classification Search
CPC ... H04W 52/362; H04W 52/42; H04W 52/48; H04W 52/50; H04W 72/0473;
(Continued)

(56) References Cited

U.S. PATENT DOCUMENTS 8,165,097 B2 4/2012 Yi et al.
8,320,318 B2 11/2012 Baker et al.
(Continued)

FOREIGN PATENT DOCUMENTS

KR 10-1264327 B1 5/2013

OTHER PUBLICATIONS

3GPP Chairman's notes, RAN1 #89, May 2017.
3GPP TR 38.802, "Study on New Radio (NR) Access Technology; Physical Layer Aspects," Rel. 14, Feb. 2017.

*Primary Examiner* — Dominic E Rego
(74) *Attorney, Agent, or Firm* — LRK Patent Law Firm

(57) ABSTRACT

A method and user equipment for transmitting a message of a random access procedure in a multi-beam system includes: transmitting and retransmitting a message 1 of the RA procedure through a first beam of a plurality of transmission beams of the UE based on power ramping; and retransmitting, if one or more Msg. 2 (RAR) is not successfully received corresponding to the message 1 transmission/retransmission, the message 1 through a second beam of the plurality of transmission beams after switching the first beam to the second beam at a second power level which is the same as or higher than a first power level of the first beam.

19 Claims, 6 Drawing Sheets

2 beams at UE     3 beams at UE

(51) Int. Cl.
*H04W 74/08* (2009.01)
*H04B 7/0408* (2017.01)
*H04B 7/06* (2006.01)
*H04W 52/42* (2009.01)
*H04W 52/50* (2009.01)
*H04B 7/0404* (2017.01)
*H04W 72/04* (2009.01)

(52) U.S. Cl.
CPC .......... *H04B 7/0617* (2013.01); *H04B 7/0695* (2013.01); *H04W 52/42* (2013.01); *H04W 52/48* (2013.01); *H04W 52/50* (2013.01); *H04W 72/0473* (2013.01); *H04W 74/0833* (2013.01)

(58) Field of Classification Search
CPC ............. H04W 74/0833; H04B 7/0404; H04B 7/0408; H04B 7/0617; H04B 7/0695
See application file for complete search history.

(56) References Cited

U.S. PATENT DOCUMENTS

| | | | |
|---|---|---|---|
| 9,276,314 B2 | 3/2016 | Bang et al. | |
| 2016/0183234 A1 | 6/2016 | Sung et al. | |
| 2017/0237477 A1* | 8/2017 | Fujio | H04B 7/06 370/329 |
| 2017/0251460 A1* | 8/2017 | Agiwal | H04W 72/0406 |
| 2018/0070380 A1* | 3/2018 | Nagaraja | H04B 7/0695 |
| 2018/0176948 A1* | 6/2018 | Islam | H04L 1/0015 |
| 2018/0176949 A1* | 6/2018 | Islam | H04W 52/146 |
| 2018/0324716 A1* | 11/2018 | Jeon | H04W 52/50 |
| 2018/0324853 A1* | 11/2018 | Jeon | H04W 74/08 |
| 2018/0331794 A1* | 11/2018 | Nagaraja | H04B 7/0695 |
| 2018/0332544 A1* | 11/2018 | Chakraborty | H04W 52/146 |
| 2018/0332625 A1* | 11/2018 | Tsai | H04B 7/0408 |

* cited by examiner 2 beams at UE       3 beams at UE

USER EQUIPMENT AND METHOD FOR
TRANSMITTING MESSAGE IN
MULTI-BEAM SYSTEM

CROSS-REFERENCE TO RELATED
APPLICATIONS

This application claims priority to and the benefit of Korean Patent Application Nos. 10-2017-0073363, 10-2017-0079082 and 10-2018-0067479, filed in the Korean Intellectual Property Office on Jun. 12, 2017, Jun. 22, 2017, and Jun. 12, 2018, respectively, the entire contents of which are incorporated herein by reference.

BACKGROUND OF THE INVENTION

1. Field of the Invention

This relates to a method and user equipment for transmitting a message 1 of a random access procedure in a multi-beam system.

2. Description of Related Art

In 3GPP NR, a multi-beam operation based on a hybrid beamforming is adopted for enhancing system performance of a wireless communication network. In order to enable the multi-beam operation, a physical random access channel (PRACH) and random access (RA) procedures including a message design need to be designed appropriately. In a meeting of the 3GPP Random Access Network (RAN) Working Group (WG), power ramping related issues for message 1 (Msg. 1) transmission/retransmission of the RA procedure has been discussed.

In NR, the power ramping will be adopted for the retransmission of the Msg. 1. In this case, user equipment (UE) conducts beam switching at its transmitter (Tx) side for the retransmission of the Msg. 1, and a counter of the power ramping remains unchanged. Although discussed as above at the 3GPP conference, there are many different ways to perform the power ramping for multiple transmission beams at the UE side, so it is difficult to determine the power ramping scheme of NR in any one way.

Considering the time delay due to multiple retransmissions and interference with other UEs, the UE behavior after reaching the maximum number of retransmissions and the maximum transmission power for the transmission/retransmission of the Msg. 1 needs to be carefully designed.

SUMMARY OF THE INVENTION

The present disclosure has been made in effort to provide a method and user equipment for transmitting a message 1 of a random access procedure in a multi-beam system.

An exemplary embodiment provides a method for transmitting a message of the RA procedure through multiple beams based on power ramping by the UE.

Another exemplary embodiment provides another method for transmitting a message of the RA procedure through multiple beams based on power ramping by the UE.

Yet another exemplary embodiment provides user equipment transmitting a message of the RA procedure through multiple beams based on power ramping.

According to an exemplary embodiment, a method for transmitting a message of a random access (RA) procedure by user equipment (UE) in a multi-beam system is provided. The method includes: transmitting and retransmitting a message 1 of the RA procedure through a first beam of a plurality of transmission beams of the UE based on power ramping; and retransmitting, if a message 2 corresponding the message 1 is not received within a random access response (RAR) window, the message 1 through a second beam of the plurality of transmission beams after switching the first beam to the second beam, wherein a second power level of the second beam is higher than a first power level of the first beam.

The transmitting and retransmitting a message 1 of the RA procedure through a first beam of a plurality of transmission beams of the UE based on power ramping may include: stopping retransmission of the message 1 if the UE successfully receives the message 2 which is corresponding to the message 1 transmitted through the first beam.

The transmitting and retransmitting a message 1 of the RA procedure through a first beam of a plurality of transmission beams of the UE based on power ramping may include: retransmitting the message 1 by increasing a power level of a transmission power of the first beam if the UE fails to receive a message 2 which is corresponding to the message 1 transmitted through the first beam.

The method may further include: after retransmitting the message 1 through a second beam, retransmitting the message 1 through the second beam at a third power level which is higher than the second power level if the UE fails to receive a message 2 which is corresponding to the message Msg. 1 retransmitted through the second beam at the second power level.

The method may further include: after retransmitting the message 1 through the second beam at a third power level, switching the second beam to a third beam of the plurality of transmission beams and retransmitting the message 1 through the third beam at a fourth power level which is higher than the third power level if the UE fails to receive a message 2 which is corresponding to the message 1 retransmitted through the second beam at the third power level.

The method may further include: after retransmitting the message 1 through the second beam, switching the second beam to a third beam of the plurality of transmission beams and retransmitting the message 1 through the third beam at a third power level which is higher than the second power level if the UE fails to receive a message 2 which is corresponding to the message 1 retransmitted through the second beam at the second power level.

A number of transmissions/retransmissions of the message 1 through transmission beams of the UE may be determined based on a subset of transmission beams of the UE.

According to another exemplary embodiment, a method for transmitting a message of a random access (RA) procedure by user equipment (UE) in a multi-beam system is provided. The method includes: transmitting and retransmitting a message 1 of the RA procedure through a first beam of a plurality of transmission beams of the UE based on power ramping; and retransmitting, if a message 2 corresponding to the message 1 is not received within a random access response (RAR) window, the message 1 through a second beam of the plurality of transmission beams after switching the first beam to the second beam, wherein a second power level of the second beam is the same as a first power level of the first beam.

The transmitting and retransmitting a message 1 of the RA procedure through a first beam of a plurality of transmission beams of the UE based on power ramping may include: stopping retransmission of the message 1 if the message 2 corresponding to the message 1 which is transmitted through the first beam is successfully received.

The transmitting and retransmitting a message 1 of the RA procedure through a first beam of a plurality of transmission beams of the UE based on power ramping may include: retransmitting the message 1 by increasing a power level of a transmission power of the first beam if the message 2 corresponding to the message 1 which is transmitted through the first beam is not received.

The method may further include: after retransmitting the message 1 through a second beam, retransmitting the message 1 through the second beam at a third power level which is higher than the second power level if a message 2 corresponding to the message 1 which is retransmitted through the second beam at the second power level is not received.

The method may further include: after retransmitting the message 1 through the second beam at the third power level, switching the second beam to a third beam of the plurality of transmission beams and retransmitting the message 1 through the third beam at the third power level if a message 2 corresponding to the message 1 which is retransmitted through the second beam at the third power level is not received.

The method may further include: after retransmitting the message 1 through the second beam, switching the second beam to a third beam of the plurality of transmission beams and retransmitting the message 1 through the third beam at the second power level if a message 3 corresponding to the message 1 which is retransmitted through the second beam at the second power level is not received.

A number of transmissions/retransmissions of the message 1 through transmission beams of the UE may be determined based on a subset of transmission beams of the UE.

According to yet another exemplary embodiment, user equipment (UE) in a multi-beam system is provided. The UE includes: a processor, a memory, and a radio frequency (RF) unit, wherein the processor executes a program stored in the memory to perform: transmitting and retransmitting, by using the RF unit, a message 1 of a random access (RA) procedure through a first beam of a plurality of transmission beams of the UE based on power ramping; and retransmitting, by using the RF unit, the message 1 through a second beam of the plurality of transmission beams after switching the first beam to the second beam if a message 3 corresponding to the message 1 is not received within a random access response (RAR) window, wherein a second power level of the second beam is the same as a first power level of the first beam or is higher than the first power level of the first beam.

When the processor performs transmitting and retransmitting of a message 1 of the RA procedure through a first beam of a plurality of transmission beams of the UE based on power ramping, the processor may perform: retransmitting the message 1 by increasing a power level of a transmission power of the first beam if the message 2 corresponding to the message 1 which is transmitted through the first beam is not received.

A number of transmissions/retransmissions of the message 1 through transmission beams of the UE may be determined based on a subset of transmission beams of the UE.

DETAILED DESCRIPTION OF THE EMBODIMENTS

Figure 1:
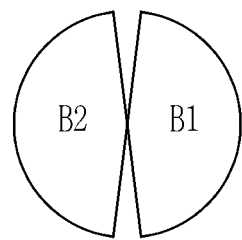
FIG. 1 is an exemplary diagram illustrating a beam pattern of UE according to an exemplary embodiment.
Figure 1:
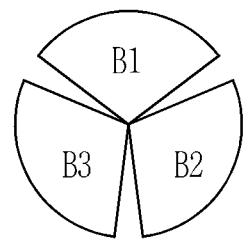
Figure 1:
Figure 1:
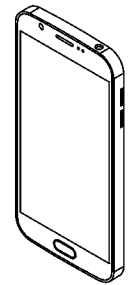

Hereinafter, exemplary embodiments of the present invention will be described in detail with reference to the accompanying drawings so that those skilled in the art may easily practice the present invention. However, the present invention may be modified in various different ways and is not limited to embodiments described herein. In the accompanying drawings, portions unrelated to the description will be omitted in order to obviously describe the present invention, and similar reference numerals will be used to describe similar portions throughout the present specification.

Throughout the specification, a user equipment (UE) may be called a terminal, mobile station (MS), a mobile terminal (MT), an advanced mobile station (AMS), a high reliability mobile station (HR-MS), a subscriber station (SS), a portable subscriber station (PSS), an access terminal (AT), a machine type communication device (MTC device), and the like and may also include all or some of the functions of the MS, the MT, the AMS, the HR-MS, the SS, the PSS, the AT, the UE, the MTCH device, and the like.

Further, the base station (BS) may be called an advanced base station (ABS), a high reliability base station (HR-BS), a node B, an evolved node B (eNodeB), an access point (AP), a radio access station (RAS), a base transceiver station (BTS), a mobile multihop relay (MMR)-BS, a relay station (RS) serving as a base station, a relay node (RN) serving as a base station, an advanced relay station (RS) serving as a base station, a high reliability relay station (HR-RS) serving as a base station, small base stations (a femto base station (femto BS), a home node B (HNB), a home eNodeB (HeNB), a pico base station (pico BS), a macro base station (macro BS), a micro base station (micro BS), and the like), and the like and may also include all or some of the functions of the ABS, the node B, the eNodeB, the AP, the RAS, the BTS, the MMR-BS, the RS, the RN, the ARS, the HR-RS, the small base stations, and the like.

For convenience, the terminologies used below follow the definitions of 3GPP NR and other NR related reports/specifications released by 3GPP. A single-beam operation may be considered as a special case of a multi-beam operation, and all the proposals in this specification may be simply applied to a single-beam system. In the present specification, the multi-beam operation is mainly described.

Hereinafter, a counter of the power ramping for the Msg. 1 transmission/retransmission of the multi-beam system is firstly described.

FIG. 1 is an exemplary diagram illustrating a beam pattern of UE according to an exemplary embodiment.

Referring to FIG. 1, the UE may use several beams, and the number of beams used by the UE may be limited due to beam mismatch which may occur frequently while the UE is moving. Referring to FIG. 1, the UE may have a beam pattern including a first beam (B1) and a second beam (B2), or a beam pattern including a first beam (B1), a second beam (B2), and a third beam (B3). When the UE using the multiple beams performs a random access (RA) to the network, a transmission beam (Tx beam) that is used for the transmission of the Msg. 1 may be determined. Determining the beam to be used for the transmission of the Msg. 1 is an implementation issue of the UE, and typically the UE may determine the Tx beam for the transmission of the Msg. 1 according to some guidelines. For example, the UE may determine the Tx beam for the Msg. 1 transmission based on an optimal reception beam which is used when the UE receives system information (SI). The direction of the Tx beam may be different from the direction of the reception beam, but if the UE determines the Tx beam of the Msg. 1 based on the optimal reception beam, the UE may determine the Tx beam which is adjacent to the optimal reception beam. That is, the UE has at least partial knowledge of beam correspondence at the UE side. It is also an implementation issue of the UE that the UE determines the Tx beam for the retransmission of the Msg. 1.

Considering the number of the counters for counting the power ramping step, there may be a single counter for all Tx beams of the UE and multiple counters for the Tx beams of the UE. Correspondingly to the time delay and the interference, the power ramping scheme may be different.

Single counter case: If there is one counter for counting the power ramping steps of all Tx beams of the UE, the following two alternatives (Alt) exist.

Alt. 1—The counter value keeps unchanged when the UE conducts the Tx beam switching.

Alt. 2—The counter value is changed when the UE conducts the Tx beam switching.

The counter change after the beam switching may theoretically decrease or increase.

In Alt. 2, it is assumed that the scenario of the power counter continues to increase considering the trade-off between the delay due to the number of retransmissions and interference.

Multiple counters case: If multiple counters are employed, these counters may be used to independently count the power ramping of each beam.

Considering the maximum number of transmissions/retransmissions of the Msg. 1 allowed by the system and the time delay due to the retransmission, a single counter may be more advantageous.

In the following, power ramping method of the multi-beam system according to an embodiment focusing on the single counter case is described.

There are three basic rules for the power ramping for the transmission/retransmission of the Msg. 1:

In the following, the Tx beam of the UE for the first transmission attempt of the Msg. 1 transmission is defined as the 'first beam' during the Msg. 1 transmission/retransmission of the UE.

1. First basic rule: The maximum transmission power for the Msg. 1 transmission/retransmission shall be reached within a first round of the Tx beam switching of the UE.

Figure 2:
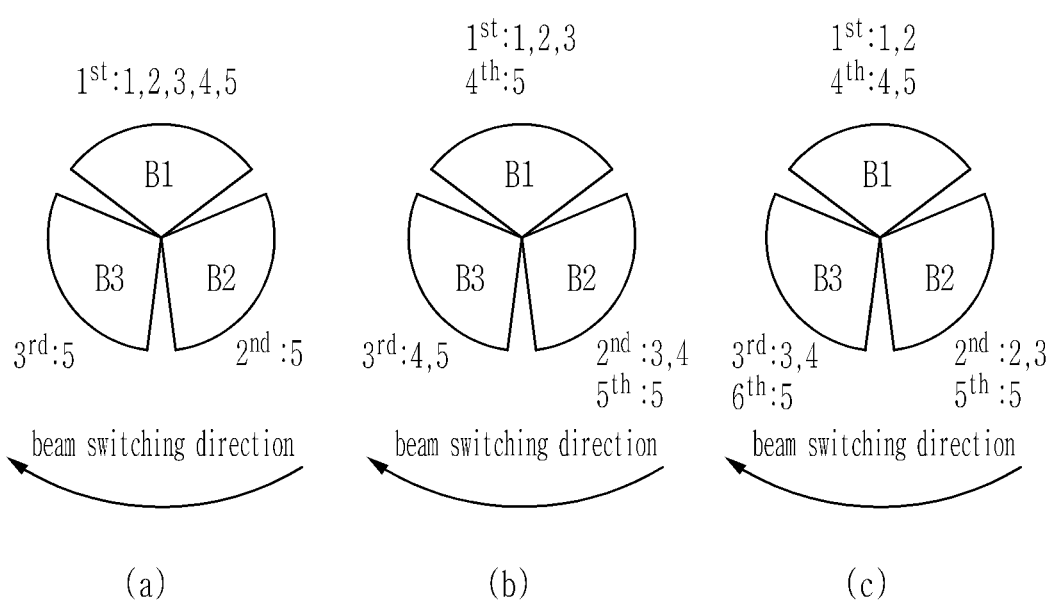
FIG. 2 is a schematic diagram illustrating power ramping method for three UE Tx beams according to an exemplary embodiment.
Figure 4:
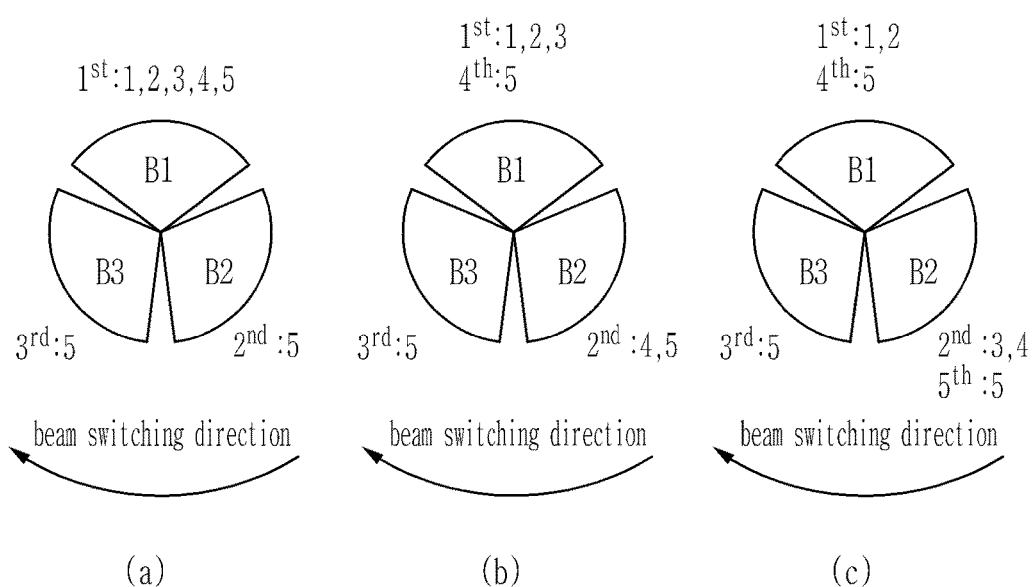
FIG. 4 is a schematic diagram illustrating power ramping method for three UE Tx beams according to another exemplary embodiment.

For the power ramping, there is the maximum transmission power at the UE side. The maximum transmission power of the UE may be configured by the network or may be determined according to the capability of the UE. The first round of the Tx beam switching of the UE indicates a procedure in which the UE performs switching from the first beam to the last beam for the first time. When the UE switches back to the first beam after the first round, the second round of the beam switching of the UE begins. In FIG. 2 and FIG. 4, the beam 1 (B1) is set as the first beam. When the UE performs the Tx beam switching, the beam switching direction is B1→B2→B3 in FIG. 2 and FIG. 4. The first round of the beam switching indicates that the beam switching is first performed from B1 to B2 and then from B2 to B3. According to the first basic rule, the transmission power of any beam in the first round in FIG. 2 and FIG. 4 reaches the maximum power level '5'. All through this specification, we assume that there are totally 5 different power levels for Msg. 1 transmission/retransmission, represented by number 1, 2, 3, 4, and 5. The power level 1 indicates the initial (lowest) power for Msg. 1 transmission and the power level 5 indicates the highest power for Msg. 1 transmission. The first basic rule is to minimize the number of the beam switching times for the Msg. 1 transmission/retransmission.

2. Second basic rule: If the current retransmission fails after the power ramping reaches the maximum transmission power in the first round of the beam switching, the UE switches to the other transmit beam direction and once again retransmits the Msg. 1 with the highest transmission power.

If the retransmission of the Msg. 1 by the maximum transmission power is successful, the UE stops the retransmission of the Msg. 1. Alternatively, the UE stops retransmission when the number of the Msg. 1 transmissions/retransmissions reaches the maximum number of times configured by the network. That is, the UE terminates the current RA cycle.

The second basic rule defines the behavior of the UE after the power of the Msg. 1 transmission/retransmission reaches the maximum transmission power.

3. Third basic rule: Depending on the maximum allowed number of the Msg. 1 transmissions/retransmissions that is limited by the network, if the last retransmission fails, the UE shall retransmit the Msg. 1 in each beam direction within a predetermined subset of the Tx beam at the maximum transmission power at least once.

The third basic rule is to ensure fairness for a plurality of transmit beam directions. A subset of Tx beam directions may be used since the UE may not need to try all its Tx beam directions but a subset of them. Note that the 'subset' may be a full set, which means that subset includes the case of all beam directions. For example, when the UE has 3 Tx beams and the elements of the subset is 1, 2, or 3, the UE may determines a subset {B1, B2} since the B1 Tx beam corresponds to a Rx beam by which the SI is received and the B2 Tx beam is adjacent to the Rx beam. In this case, the UE does not need to transmit the Msg. 1 on B3 Tx beam since the B3 is far from the direction of the Rx beam. That is, the UE may use the subset {B1, B2} for the Msg. 1 transmission/retransmission. The use of the subset of the Tx beam direction may reduce the total number of the Tx beams for Msg. 1 transmission/retransmission. In addition, the subset of the Tx beam may be beneficial for reducing the Msg. 1 transmission delay and reducing the interference in PRACH to other users. On the other hand, considering interference and a delay or transmission/retransmission, only one trial of maximum Tx power for each beam direction in the selected subset of Tx beams may be allowed.

The Msg. 1 may be transmitted with the maximum transmission power even after the beam switching of the first round. Referring to FIG. 2 and FIG. 4, the UE may attempt to transmit the Msg. 1 with the maximum transmission power only once within a selected subset of beam directions for each Tx beam direction. In FIG. 2 and FIG. 4, there are five different power levels {1, 2, 3, 4, 5} for the Msg. 1 transmission/retransmission and the Msg. 1 transmission/retransmission starts from the first beam at the power level 1. For example, "$1^{st}$: 2, 3, 4, 5" depicted for 'B1' in (a) of FIG. 2 and FIG. 4 indicates that the B1 is the first beam and the Msg. 1 is transmitted through the B1 at the power levels 1, 2, 3, 4, and 5 before the beam switching is performed. In this case, '1' indicates a power level for the transmission of the Msg. 1 and '2, 3, 4, 5' indicate power levels for the retransmission of the Msg. 1. "$2^{nd}$: 5" depicted for 'B2' in (a) of FIG. 2 and FIG. 4 indicates that the B2 is the second beam and the Msg. 1 is transmitted through B2 at the power level 5. In the exemplary embodiment, all Tx beam directions may be selected by the UE for the Msg. 1 transmission/retransmission.

Figure 3:
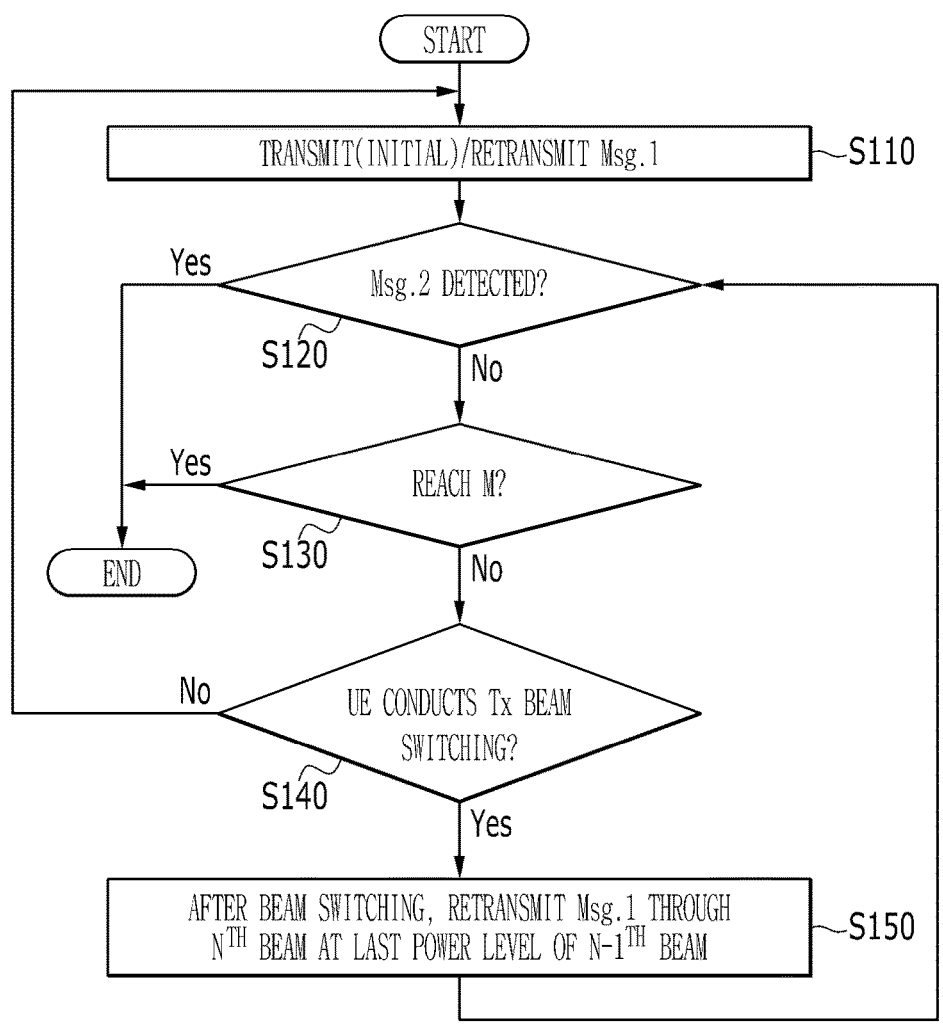
FIG. 3 is a flowchart illustrating power ramping method for three UE Tx beams according to the exemplary embodiment.

FIG. 2 is a schematic diagram illustrating power ramping method for three UE Tx beams according to an exemplary embodiment, and FIG. 3 is a flowchart illustrating power ramping method for three UE Tx beams according to the exemplary embodiment.

FIG. 2 shows three examples of the power ramping method according to the Alt. 1 to which the single power ramping counter is applied. That is, in FIG. 2, the power level does not change when the UE performs the Tx beam switching. For example, if the UE transmits/retransmits the Msg. 1 through the B1 and switches the beam, the same power level applied to the B1 is used by the B2 after the Tx beam switching.

Referring to FIG. 3, the UE transmits/retransmits the Msg. 1 through the first beam (S110). When the UE retransmits the Msg. 1 through the first beam, the UE may apply the power ramping. The number of Msg. 1 transmissions/retransmissions through the first beam may follow a predetermined subset. For example, in (a) of FIG. 2, the Msg. 1 is transmitted at the power level 1 and is retransmitted at the power levels 2, 3, 4, and 5 through the B1. After the Msg. 1 is transmitted/retransmitted through the first beam, the UE determines whether the Msg. 1 transmission/retransmission is successful (S120). According to an exemplary embodiment, the UE may receive one or more dedicated Msg. 2 within a random access response (RAR) window which is monitored by the UE and indicates the success of the Msg. 1 from the base station. If the transmission of the Msg. 1 is successful after the message 1 is transmitted or retransmitted through the first beam, the UE may transmit the Msg. 3 of the RA procedure by using same or different Tx beam direction for its successful Msg. 1 transmission/retransmission.

If the message is not received, the UE determines whether the number of the transmission/retransmission of the Msg. 1 reaches the maximum number M of transmission of the Msg. 1 preconfigured by the network (S130). When the maximum number M of transmissions of Msg. 1 is reached, the UE stops transmitting/retransmitting the Msg. 1. However, if the maximum number of transmissions of the Msg. 1 is not reached, the UE, determines whether the UE conducts Tx beam switching (S140). If the UE does not perform Tx beam switching, the UE may retransmits the Msg. 1 through the first beam. If the Msg. 1 transmission/retransmission through the current beam (n-$1^{th}$ beam) fails, the UE may conduct Tx beam switching and retransmits the Msg. 1 through the next beam ($n^{th}$ beam) at the last power level of the previous beam (n-$1^{th}$ beam) after UE switches the previous beam to the next (S150).

For example, if the Msg. 1 transmission/retransmission through the first beam fails, the UE may perform retransmission of the Msg. 1 through the second beam, where the power level of the retransmission power for the Msg. 1 through the second beam, is to the same as the last power level of the first beam. Then, if the retransmission of the Msg. 1 fails (S140), the UE retransmits the Msg. 1 through the $n^{th}$ beam or n+$1^{th}$ beam which is switched from the nth beam. For example, after the retransmission of the Msg. 1 through the second beam, the UE may retransmit the Msg. 1 through the second beam by performing the power ramping. Alternatively, after the retransmission of the Msg. 1 through the second beam, the UE may retransmit the Msg. 1 through a third beam, where the power level of the third beam is the same as the last power level of the second beam.

In (a) of FIG. 2, the UE uses the same beam B1 for transmission/retransmission of the Msg. 1 and gradually increases the transmission power. When the transmission power of the B1 reaches the maximum transmission power (for example, 5), the UE switches the transmission beam to the remaining beams in the predetermined subset (for example, B2 and B3) and retransmits the message 1 once at the maximum transmission power.

In (b) of FIG. 2, the UE switches the transmission beam for the Msg. 1 transmission/retransmission, where the maximum transmission power is reached throughout the first round of the beam switching. Referring to (b) of FIG. 2, the UE transmits/retransmits the Msg. 1 by using the B1 and increases the transmission power to the power level 3 at the retransmission. Thereafter, if the Msg. 1 fails, the UE retransmits the Msg. 1 at the power level 3 by using the switched B2 and then the power level of the retransmission power is increased to 4. In this case, the power level 3 which is initially applied to the B2 is the last power level of the B1. Then, if the Msg. 1 fails, the UE retransmits the Msg. 1 through the B3 at the power level 4, and the power level of the retransmission power is increased to 5. In this case, the power level 4 which is initially applied to the B3 is the last power level of the B2. In the exemplary embodiment according to (b) of FIG. 2, the maximum transmission power 5 is firstly used for the B3. That is, the maximum transmission power is reached within the first round of the beam switching.

In (c) of FIG. 2, the UE performs the first round of the beam switching for the Msg. 1 transmission/retransmission without using the maximum transmission power. That is, the maximum transmission power is initially applied to the first beam B1 of the second round of the beam switching, which is against the second basic rule. However, theoretically, the scenario of (c) of FIG. 2 is also possible.

Figure 5:
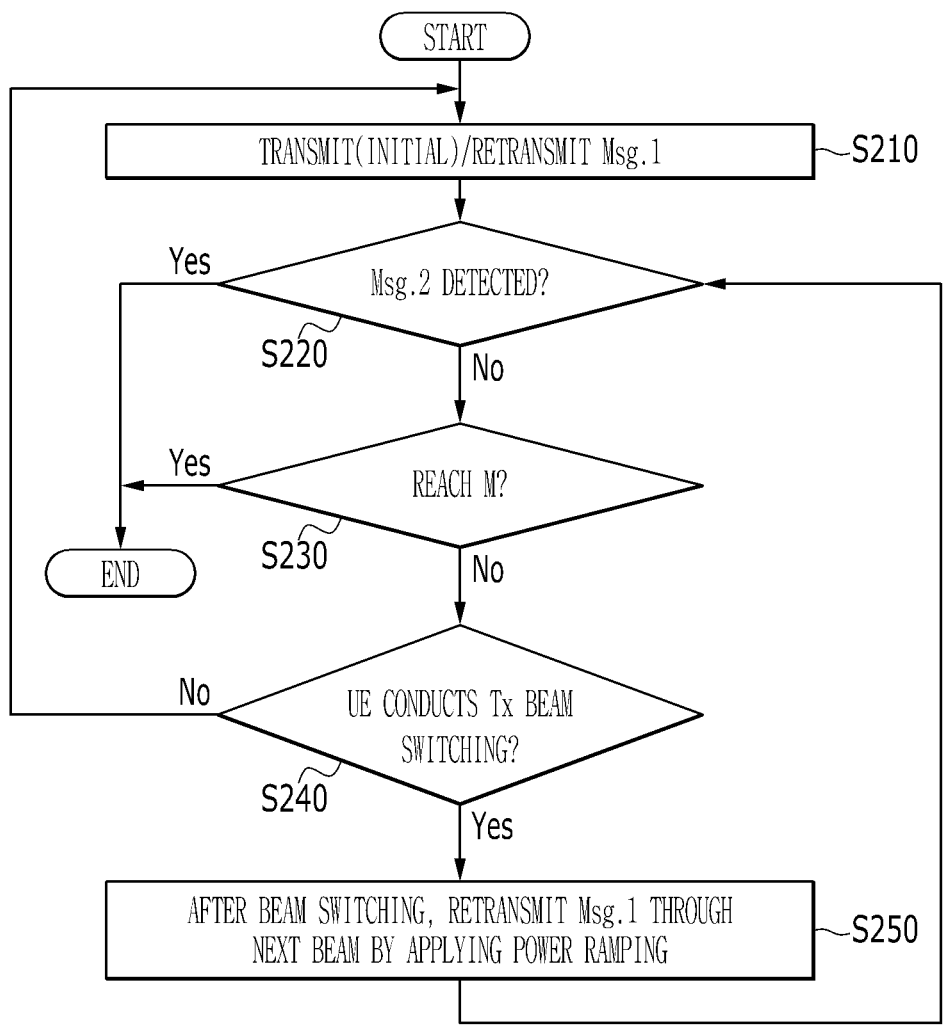
FIG. 5 is a flowchart illustrating power ramping method for three UE Tx beams according to another exemplary embodiment.

FIG. 4 is a schematic diagram illustrating power ramping method for three UE Tx beams according to another exemplary embodiment, and FIG. 5 is a flowchart illustrating power ramping method for three UE Tx beams according to another exemplary embodiment.

FIG. 4 shows three examples of the power ramping method according to the Alt. 2 to which the single power ramping counter is applied. That is, in FIG. 4, when the UE performs the beam switching, the power is increased and the power ramping is applied to the adjacent beam. For example, if the UE transmits/retransmits the Msg. 1 through the B1 and switches the beam, the next power level of the power level applied to the B1 is applied to the B2 after beam switching.

Referring to FIG. 5, the UE transmits/retransmits the Msg. 1 through the first beam (S210). When the UE retransmits the Msg. 1 through the first beam, the UE may apply the power ramping. The number of the Msg. 1 transmissions/retransmissions through the first beam may follow a predetermined subset. For example, in (a) of FIG. 4, the Msg. 1 is transmitted at the power level 1 and is retransmitted at the power levels 2, 3, 4, and 5 through the B1. After the Msg. 1 is transmitted/retransmitted through the first beam, the UE determines whether the Msg. 1 transmission/retransmission is successful (S220). According to an exemplary embodiment, the UE may receive one or more dedicated Msg. 2 within the RAR window which is monitored by the UE and indicates the success of the Msg. 1 from the base station Msg. 1. If the transmission of the Msg. 1 is successful after the message 1 is transmitted or retransmitted through the first beam, the UE may transmit the Msg. 3 of the RA procedure by using same or different Tx beam direction for its successful Msg. 1 transmission/retransmission.

If the message is not received, the UE determines whether the number of the transmission/retransmission of the Msg. 1 reaches the maximum number M of transmission of the Msg. 1 preconfigured by the network (S230). When the maximum number M of transmissions of Msg. 1 is reached, the UE stops transmitting/retransmitting the Msg. 1. However, if the maximum number of transmissions of the Msg. 1 is not reached, the UE determines whether the UE conducts Tx beam switching (S240). If the UE does not perform Tx beam switching, the UE may retransmits the Msg. 1 through the first beam. If the Msg. 1 transmission/retransmission through the current beam (n−1$^{th}$ beam) fails, the UE may retransmit the Msg. 1 through the next beam (n$^{th}$ beam) by applying the power ramping to the last power level of the previous beam (n−1$^{th}$ beam) after UE switches the previous beam to the next (S250). For example, if the Msg. 1 transmission/retransmission through the first beam fails, the UE may perform retransmission of the Msg. 1 through the second beam, where the power level of the retransmission power for the Msg. 1 through the second beam is equal to 'the last power level of the first beam+1'. Then, if the retransmission of the Msg. 1 fails, the UE may retransmit the Msg. 1 through the n$^{th}$ beam or the n+1$^{th}$ beam which is switched from the n$^{th}$ beam. For example, after the retransmission of the Msg. 1 through the second beam, the UE may retransmit the Msg. 1 through the second beam by performing the power ramping. Alternatively, after the retransmission of the Msg. 1 through the second beam, the UE may retransmit the Msg. 1 through a third beam switched from the second beam, where the power level of the third beam is the same as the last power level of the second beam+1.

In (a) of FIG. 4, the beam switching and the transmission/retransmission of the Msg. 1 are the same as in (a) of FIG. 2. This is because the power ramping only applies to B1 until it reaches the maximum transmission power. Therefore, the power level 5, which is the maximum transmission power, is applied for the retransmission of the message 1 through the remaining beams (B2 and B3).

In (b) of FIG. 4, the UE switches the transmission beam for the Msg. 1 transmission/retransmission, where the maximum transmission power is reached throughout the first round of the beam switching. Referring to (b) of FIG. 4, the UE transmits/retransmits the Msg. 1 by using the B1 and increases the transmission power to the power level 3 at the retransmission. Thereafter, if the Msg. 1 fails, the UE retransmits the Msg. 1 at the power level 4 (the power ramping is applied) by using the switched B2 and then the power level of the retransmission power is increased to 5. Then, if the Msg. 1 fails, the UE retransmits the Msg. 1 by using the B3 at the power level 5. Since the maximum transmission power has already been reached at the B2, no power ramping has been applied to B3.

In (c) of FIG. 4, the UE switches the transmission beam for the Msg. 1 transmission/retransmission, where the maximum transmission power is reached throughout the first round of the beam switching. Referring to (c) of FIG. 4, the UE transmits/retransmits the Msg. 1 by using the B1 and increases the transmission power to the power level 2 at the retransmission. Thereafter, if the Msg. 1 fails, the UE retransmits the Msg. 1 at the power level 3 (power ramping is applied) by using the B2 and then the power level of the retransmission power is increased to 4. Then, if the Msg. 1 fails, the UE retransmits the Msg. 1 at the power level 5 by using the B3. The maximum transmission power is reached at the B3.

The power ramping method described in FIGS. 2 to 5 may be stopped when a response signal (Msg. 2 which is also known as RAR) indicating successful transmission/retransmission of the Msg. 1 is received from the base station. That is, the power ramping method described in FIGS. 2 to 5 is merely a logical step in power ramping, not a practical power ramping procedure. The entire steps shown in FIGS. 2 to 5 may be performed when the Msg. 1 transmission/retransmission fails. If the Msg. 1 transmission/retransmission is successful, the UE according to an exemplary embodiment may continue to transmit Msg. 3 of the RA procedure.

The maximum transmission power and the maximum number of transmissions allowed for the Msg. 1 transmission/retransmission in the actual system may be configured to the UE by the network. Since the different UEs have different capabilities, the total number of power ramping steps may also be different. Therefore, the UE needs to determine the size of the power ramping step that can satisfy the network requirements, within the maximum transmission power and the maximum number of transmissions allowed for the Msg. 1 transmission/retransmission, predetermined by the network.

In the following, the maximum number of transmissions of message 1 set in the network is M, and the maximum transmission power is $P_{max\_NW}$. The number of transmission beams in a subset at the UE is N, and the UE may transmit the message 1 through the transmission beam at the maximum transmit power $P_{max\_UE}$. The power level $f(P_{PL})$ at which the UE initially transmits message 1 is a function of the estimated path loss (PL) $P_{PL}$. The estimated path loss $P_{PL}$ may be calculated by the UE in consideration of the target reception power and other parameters. According to the principle of equal step size with respect to intensity of power, the size $P_{step}$ of the power ramping step in FIG. 2(a) and FIG. 3 may be calculated according to Equation 1.

$$P_{step} = \frac{[P_{max} - f(P_{PL})]}{(M - N)} \qquad \text{(Equation 1)}$$

If there is no predetermined maximum transmission power $P_{max\_NW}$ by the network in Equation (1), $P_{max}=P_{max\_UE}$. If $P_{max\_NW}$ is configured as the maximum allowed transmission power for the UE, $P_{max}=\min(P_{max\_NW}, P_{max\_UE})$, $\min(P_{max\_NW}, P_{max\_UE})$ indicates selecting a smaller value between $P_{max\_UE}$ and $P_{max\_NW}$. In the case of (b) of FIG. 2, since the maximum transmission power is not reached at the B1 but reaches at the n-th beam, the size $P_{step}$ of the power ramping step may be calculated as shown in Equation 2 below.

$$P_{step} = \frac{[P_{max} - f(P_{PL})]}{(M - N - n + 1)} \quad \text{(Equation 2)}$$

In Equations (1) and (2), the size of the power ramping step increases linearly.

According to another exemplary embodiment, the size of the power ramping step may increase non-linearly. For example, the size of the power ramping step may be determined based on the cumulative distribution function (CDF) of the transmission/retransmission success rate of the Msg. 1 versus the transmission power level of the UE. In the CDF function, F(P) denotes the CDF value of the transmission power level P of the UE. According to the principle of equal probability step size, the same probability step size $Prob_{step}$ for the Msg. 1 transmission/retransmission in (a) of FIG. 2 and FIG. 3 may be calculated as Equation 3.

$$Prob_{step} = \frac{\{F(P_{max}) - F[f(P_{PL})]\}}{(M - N)} \quad \text{(Equation 3)}$$

The same probability step size $Prob_{step}$ for the transmission/retransmission of the Msg. 1 in (b) of FIG. 2 may be calculated as Equation 4 below.

$$Prob_{step} = \frac{\{F(P_{max}) - F[f(P_{PL})]\}}{(M - N - n + 1)} \quad \text{(Equation 4)}$$

Then, the power level of the $m^{th}$ transmission/retransmission of the Msg. 1 may be calculated as Equation 5 below.

$$F(P_m) = F[f(P_{PL}) + (m-1) \cdot Prob_{step}] \quad \text{(Equation 5)}$$

In Equation 5, $1 \leq m \leq M$.

As, described above, the UE may perform the transmission/retransmission of the Msg. 1, which is suitable for the multi-beam system, using the power ramping method according to the exemplary embodiments.

Also, in the multi-beam system, when the UE performs the power ramping and transmits/retransmits the Msg. 1, the number of beam switching times may be reduced to lower the complexity and the power consumption of the UE.

Figure 6:
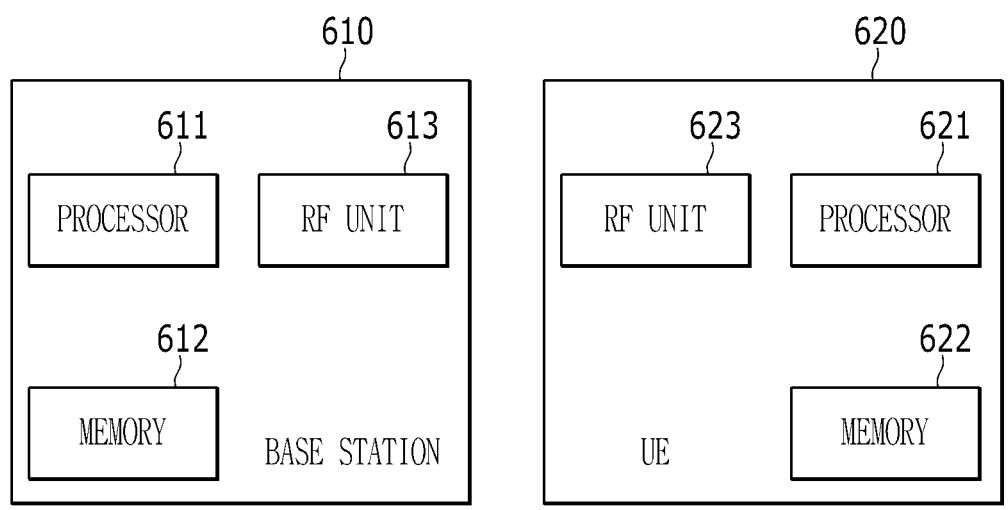
FIG. 6 is a block diagram illustrating a wireless communication system according to an exemplary embodiment of the present invention.

FIG. 6 is a block diagram illustrating a wireless communication system according to an exemplary embodiment of the present invention.

Referring to FIG. 6, a wireless communication system according to an exemplary embodiment includes a base station 610 and UE 620. The base station 610 includes a processor 611, a memory 612, and a radio frequency unit (RF unit) 613. The memory 612 may be connected to the processor 611 to store various pieces of information for driving the processor 611 or at least one program executed by the processor 611. The radio frequency unit 613 may be connected to the processor 611 to transmit/receive a wireless signal. The processor 611 may implement functions, processes, or methods proposed by the exemplary embodiment. In this case, in the wireless communication system according to the exemplary embodiment, a wireless interface protocol layer may be implemented by the processor 611. An operation of the base station 610 according to the exemplary embodiment may be implemented by the processor 611.

The UE 620 includes a processor 621, a memory 622, and an RF unit 623. The memory 622 may be connected to the processor 621 to store various pieces of information for driving the processor 621 or at least one program executed by the processor 621. The radio frequency unit 623 may be connected to the processor 621 to transmit/receive a wireless signal. The processor 621 may implement functions, processes, or methods proposed by the exemplary embodiment. In this case, in the wireless communication system according to the exemplary embodiment, a wireless interface protocol layer may be implemented by the processor 621. An operation of the terminal 620 according to the exemplary embodiment may be implemented by the processor 621.

According to the exemplary embodiment of the present invention, the memory may be positioned inside or outside the processor, and the memory may be connected to the processor through various already known means. The memory may be various types of volatile or non-volatile storage media. For example, the memory may include a read-only memory (ROM) or a random access memory (RAM).

While this invention has been described in connection with what is presently considered to be practical example embodiments, it is to be understood that the invention is not limited to the disclosed embodiments, but, on the contrary, is intended to cover various modifications and equivalent arrangements included within the spirit and scope of the appended claims.

What is claimed is:

1. A method for transmitting a message of a random access (RA) procedure by user equipment (UE) in a multi-beam system, the method comprising:
   determining a subset of beams of a plurality of transmission beams;
   transmitting a message 1 of the RA procedure through a first beam of the subset of beams with a first power;
   determining, in response to not receiving a message 2 corresponding to the message 1 within a random access response (RAR) window, a second beam of the subset of beams; and
   retransmitting the message 1 through the second beam with a second power after switching the first beam to the second beam,
   wherein the transmitting of the message 1 of the RA procedure through the first beam comprises stopping retransmission of the message 1 when the UE successfully receives the message 2 corresponding to the message 1 transmitted through the first beam within the RAR window, and
   wherein a number of transmissions of the message 1 through the plurality of transmission beams of the UE is determined based on the subset of beams of the UE.

2. The method of claim 1, wherein the second power of the second beam is larger than the first power of the first beam.

3. The method of claim 1, wherein the transmitting of the message 1 of the RA procedure through the second beam comprises:
   retransmitting the message 1 through the second beam with the second power having a maximum level when the subset of beams consists of the first beam and the second beam.

4. The method of claim 1, further comprising:
   after retransmitting the message 1 through the second beam,
   retransmitting the message 1 through a third beam with a third power having a maximum level when the UE fails to receive the message 2 corresponding to the message 1 retransmitted through the second beam and the subset of beams consists of the first beam, the second beam, and the third beam.

5. The method of claim 4, further comprising:
after retransmitting the message 1 through the third beam with the third power,
switching the third beam to the first beam of the subset of beams and retransmitting the message 1 through the first beam with the third power when the UE fails to receive the message 2 corresponding to the message 1 retransmitted through the third beam with the third power.

6. The method of claim 1, further comprising:
receiving, from a base station, a radio resource control (RRC) message including configuration for a maximum number of transmissions of the message 1.

7. The method of claim 1, wherein the second power of the second beam is the same as the first power of the first beam.

8. A method for transmitting a message of a random access (RA) procedure by user equipment (UE) in a multi-beam system, the method comprising:
determining a subset of beams of a plurality of transmission beams;
transmitting a message 1 of the RA procedure through a first beam of the subset of beams of the UE with a first power; and
retransmitting, when a message 2 corresponding to the message 1 is not received within a random access response (RAR) window, the message 1 through a second beam of the plurality of transmission beams with the first power after switching the first beam to the second beam; and
retransmitting, when the message 2 corresponding to the message 1 is not received within an RAR window, the message 1 through the second beam with a second power being larger than the first power,
wherein the transmitting and retransmitting of the message 1 of the RA procedure through the first beam comprises stopping retransmission of the message 1 if the message 2 corresponding to the message 1 transmitted through the first beam is successfully received within the RAR window, and
wherein a number of transmissions of the message 1 through transmission beams of the UE is determined based on a subset of the transmission beams of the UE.

9. The method of claim 8, wherein the second power of the second beam is larger than the first power of the first beam.

10. The method of claim 9, wherein the second power of the second beam is the same as the first power of the first beam.

11. The method of claim 8, wherein the transmitting of the message 1 of the RA procedure through the second beam comprises:
transmitting the message 1 through the second beam with the second power having a maximum level when the subset of beams consists of the first beam and the second beam.

12. The method of claim 8, further comprising:
after retransmitting the message 1 through the second beam,
retransmitting the message 1 through a third beam with a third power having a maximum level when the message 2 corresponding to the message 1 retransmitted through the second beam with the second power is not received and the subset of beams consists of the first beam, the second beam, and the third beam.

13. The method of claim 12, further comprising:
after retransmitting the message 1 through the third beam with the third power,
switching the third beam to the first beam of the subset of beams and retransmitting the message 1 through the first beam with the third power when the message 2 corresponding to the message 1 retransmitted through the third beam with the third power is not received.

14. The method of claim 8, further comprising:
receiving, from a base station, a radio resource control (RRC) message including configuration for a maximum number of transmissions of the message 1.

15. User equipment (UE) in a multi-beam system, comprising:
a processor, a memory, and a radio frequency (RF) unit,
wherein the processor executes a program stored in the memory to perform:
determining a subset of beams of a plurality of transmission beams;
transmitting, by using the RF unit, a message 1 of a random access (RA) procedure through a first beam of the subset of beams with a first power;
determining, in response to not receiving a message 2 corresponding to the message 1 within a random access response (RAR) window, a second beam of the subset of beams; and
retransmitting, by using the RF unit, the message 1 through the second beam with a second power being larger than the first power after switching the first beam to the second beam,
wherein the transmitting of the message 1 of the RA procedure through the first beam comprises stopping retransmission of the message 1 when the UE successfully receives the message 2 corresponding to the message 1 transmitted through the first beam within the RAR window, and
wherein a number of transmissions of the message 1 through the plurality of transmission beams of the UE is determined based on the subset of beams of the UE.

16. The UE of claim 15, wherein when the processor performs transmitting of the message 1 of the RA procedure through the second beam, the processor performs:
retransmitting the message 1 through the second beam with the second power having a maximum level when the subset of beams consists of the first beam and the second beam.

17. The UE of claim 15, wherein the processor executes the program to further perform:
retransmitting, after the retransmission of the message 1 through the second beam with the second power, the message 1 through a third beam with a third power having a maximum level when the UE fails to receive the message 2 within the RAR window and the subset of beams consists of the first beam, the second beam, and the third beam.

18. The UE of claim 17, wherein the processor executes the program to further perform:
switching, after retransmitting the message 1 through the third beam with the third power, the third beam to the first beam of the subset of beams and retransmitting the message 1 through the first beam with the third power when the UE fails to receive the message 2 corresponding to the message 1 retransmitted through the third beam with the third power.

19. The UE of claim 15, wherein the processor executes the program to further perform:
   receiving, from a base station, a radio resource control (RRC) message including configuration for a maximum number of transmissions of the message 1.

* * * * *